United States Patent [19]  
Kurobe et al.

[11] 4,319,016  
[45] Mar. 9, 1982

[54] ULTRAVIOLET-ABSORBING AMINO COMPOUND AND METHOD OF MAKING

[75] Inventors: Moriji Kurobe; Ryusuke Tsuji; Eiichi Imao, all of Nagoya; Takayuki Masuyama, Toyota; Eizi Nagata; Kazunori Kamada, both of Yokohama, all of Japan

[73] Assignees: Kabushiki Kaisha Toyota Chuo Kenkyusho; Toyota Jidosha Kogyo Kabushiki Kaisha, both of Aichi; Mitsui Toatsu Chemicals Incorporated, Tokyo, all of Japan

[21] Appl. No.: 77,882

[22] Filed: Sep. 21, 1979

[30] Foreign Application Priority Data

Sep. 28, 1978 [JP] Japan ................................. 53-119965

[51] Int. Cl.$^3$ ............................ C08G 8/26; B32B 9/04
[52] U.S. Cl. ................................ 528/127; 528/129; 528/148; 528/162; 528/163; 525/443; 525/134; 525/516; 427/160; 428/411; 428/482; 428/480; 428/502; 428/522; 548/146; 427/385.5; 427/393.5; 427/388.3
[58] Field of Search ............... 525/134, 443, 516; 528/129, 148, 162, 163, 127, 227; 428/411, 913, 480, 482, 502, 522; 427/160

[56] References Cited

U.S. PATENT DOCUMENTS

| | | | |
|---|---|---|---|
| 2,337,873 | 12/1943 | D'Alelio | 528/129 X |
| 2,702,823 | 2/1955 | Smith et al. | 528/129 X |
| 2,819,241 | 1/1958 | Groote | 528/148 X |
| 2,819,242 | 1/1958 | Groote | 528/148 X |
| 3,043,709 | 7/1962 | Amborski | 427/160 |
| 3,108,083 | 10/1963 | Laganis | 525/443 X |
| 3,108,089 | 10/1963 | Ferstandig | 525/443 |
| 4,085,085 | 4/1978 | Tsuchiya et al. | 528/129 X |
| 4,107,141 | 8/1978 | Moiseev et al. | 528/129 |
| 4,173,684 | 11/1979 | Stolfo | 428/913 |

Primary Examiner—P. Ives  
Attorney, Agent, or Firm—Blum, Kaplan, Friedman, Silberman & Beran

[57] ABSTRACT

An ultraviolet-absorbing amino compound; a paint containing the aforesaid ultraviolet-absorbing amino compound; and a coated article having on its surface a coated film containing the aforesaid ultraviolet-absorbing amino compound are provided. The ultraviolet-absorbing amino compound is produced by reacting (a) a compound having a light absorption maximum within a wavelength region of 300 to 400 m$\mu$ and containing a mono-, di- or tetra-hydroxyphenyl group, (b) at least one compound containing a amino group and (c) formaldehyde, in the presence of at least one alcohol. The ultraviolet-absorbing amino compound of this invention is used in resin products which undergo photodegradation by ultraviolet light, for example, paints or molded articles of resins, and is especially effective for use in thermosetting synthetic resin paints.

29 Claims, No Drawings

ULTRAVIOLET-ABSORBING AMINO COMPOUND AND METHOD OF MAKING

BACKGROUND OF THE INVENTION

This invention relates generally to an improved ultraviolet-absorbing amino compound, and in particular to an ultraviolet-absorbing amino compound which has superior outdoor durability over a long period of time, does not suffer from degradation in chemical resistance and moisture resistance even when used in large quantities and which is compatible over a wide range; to a paint containing said compound; and to a coated article having on its surface a coated film containing said compound.

Frequently, thermosetting synthetic resin paints are coated on the surfaces of articles, for example, automobiles and building materials, which are used outdoors for long periods of time. Ultraviolet light tends to degrade the coated films resulting in various defects in the films, such as cracks, peeling or gloss reduction. In addition, the ultraviolet light which passes through the upper region of the coating causes degradation for example, chalking of the intermediate regions of the coating or the surface layer of a primer coating beneath it, and consequently, the top coating tends to peel off.

Satisfactory ultraviolet absorbers which would avoid such defects in long-term outdoor use have been desired in the past, but sufficient results have not yet been obtained. Ultraviolet absorbers for paints are used in admixture with other ingredients, such as synthetic resins. The conventional ultraviolet absorbers, in long-term outdoor use, tend to volatilize or wash away and gradually lose their effects. Moreover, during the step of baking (curing) a coated film, conventional ultraviolet absorbers tend to volatilize. Thus, the amount of the ultraviolet absorber remaining in the hardened coated film is less than the amount actually mixed with the paint. This lowers the absorbing properties and results in much waste.

Attempts to prevent photodegradation by increasing the amount of the ultraviolet absorber to be mixed tend to result in deterioration of physical properties. Typically chemical resistance and moisture resistance of a coated film deteriorate, resulting in discoloration or blistering of the coating. In addition, conventional ultraviolet absorbers have poor compatibility with certain synthetic resins or solvents. Hence, they are not uniformly dispersed and tend to precipitate in the paints. This interferes with formation of a smooth coated surface.

Accordingly, it would be desirable to provide an improved ultraviolet-absorbing material which is free from these defects of conventional ultraviolet absorbers, has superior outdoor durability over a long period of time, does not suffer from degradation in chemical resistance and moisture resistance even when used in large quantities, and which has a wide range of compatability; a paint containing the material and a coated article having on its surface a coated film containing the material.

SUMMARY OF THE INVENTION

The ultraviolet-absorbing material of this invention is a novel ultraviolet absorbing amino compound which is the reaction product of (a) a hydroxyphenyl ultraviolet light absorbing compound having a light absorption maximum within a wavelength region of 300 to 400 m$\mu$ and containing a mono-, di-, or tetra-hydroxyphenyl group, (b) a compound containing at least one amino group and (c) formaldehyde, in the presence of at least one alcohol.

The hydroxyphenyl compound includes hydroxybenzophenone compounds, hydroxyphenyl benzotriazole compounds and phenyl salicylate compounds. Between about 0.01 and 0.5 mole of the hydroxyphenyl compound is reacted with between about 3 and 8 moles of formaldehyde and from about 3 to 30 moles of alcohol per mole of an amino compound.

The amino compound includes melamine, guanamine and the like. The alcohols used include aliphatic or alicyclic alcohols, glycol ethers, ketoalcohols and polyhydric alcohols and is a solvent for the reaction. The temperature of the reaction is between about 30° C. and 150° C. for from about 2 to 30 hours.

The ultraviolet-absorbing amino compound of the invention can be included from 0.1 to 50.0 weight percent in a synthetic resin, such as a paint or molded article without causing degradation of physical properties. The ultraviolet-absorbing amino compound includes an amino, methylol or alkoxymethylol group and is reactive at elevated temperatures with a synthetic resin upon mixing. Thus, it is especially suitable for use with thermosetting synthetic resins, such as (meth)acrylate copolymers, alkyd resins, polyester resins and melamine resins. The ultraviolet-absorbing amino compound may be included in a paint from 2 to 50 weight percent.

Therefore, it is a principal object of the present invention to provide an improved ultraviolet absorber which is free from various defects of the conventional ultraviolet absorbers.

It is another object of the invention to provide an improved ultraviolet absorbing material having superior outdoor durability over extended periods of time, does not degrade the chemical and moisture resistance of a film or paint when used in large quantities and which is compatible with solvents over a wide range.

It is a further object of the invention to provide an ultraviolet-absorbing paint which has superior outdoor durability over a long period of time.

Still a further object of the invention is to provide an ultraviolet-absorbing material which does not suffer from degradation in chemical resistance and moisture resistance even when used in large quantities.

An even further object of the invention is to provide an ultraviolet absorber which has a wide range of compatibility.

Another object of the invention is to provide a paint containing the ultraviolet-absorbing material which is soluble over a wide range in various solvents and which avoids precipitating from the solvents.

It is an additional object of the invention to provide a paint containing the ultraviolet-absorbing material which does not volatilize during curing of a coated film.

A still further object of the invention is to provide a coated article having on its surface a coated film containing the ultraviolet-absorbing material having superior outdoor durability over a long period of time.

Yet another object of the invention is to provide a method for preparing the improved ultraviolet-absorbing amino compound.

Still other objects and advantages of the invention will in part be obvious and will in part be apparent from the specification.

The invention accordingly comprises the several steps and the relation of one or more of such steps with respect to each of the others, and the composition and article possessing the features, properties, and the relation of constituents, which are exemplified in the following detailed disclosure, and the scope of the invention will be indicated in the claims.

DESCRIPTION OF THE PREFERRED EMBODIMENTS

The hydroxyphenyl compound used in this invention is, for example, a hydroxybenzophenone compound, a hydroxyphenyl benzotriazole compound, or a phenyl salicylate compound. Examples of the hydroxybenzophenone compound are 2-hydroxy-4-methoxybenzophenone, 2,4-dihydroxybenzophenone, 2-hydroxy-4-methoxy-4'-chlorobenzophenone, 2-hydroxy-4-n-octoxybenzophenone, 2,2'-dihydroxybenzophenone, 2,2'-dihydroxy-4-methoxybenzophenone, 2-hydroxy-4-methoxy-2'-carboxybenzophenone, 2,2'-dihydroxy-4,4'-dimethoxybenzophenone, and 2,2',4,4'-tetrahydroxybenzophenone. Examples of the hydroxyphenyl benzotriazole compound are 2-(2'-hydroxyphenyl)benzotriazole, 2-(2-hydroxy-5-methyl-phenyl)-2H-benzotriazole, 2-(2'-hydroxy-5'-methylphenyl) benzotriazole, 2-(2'-hydroxy-3',5'-dineopentylphenyl)benzotriazole, 2-(2'-hydroxy-3',5'-tertiary dibutylphenyl)-6-chlorobenzotriazole, and 2-(2'-hydroxy-3',5'-ditertiary amylphenyl)benzotriazole. Examples of the phenyl salicylate compound are phenyl salicylate, 4-tertiary butyl-phenyl salicylate and 4-octylphenyl salicylate.

So long as the hydroxyphenyl compound has a light absorption maximum within a wavelength range of 300 to 400 m$\mu$ and contains a mono-, di- or tetra-hydroxyphenyl group, the types or numbers of alkyl and alkoxyl group substituents may vary. The compound itself is an ultraviolet absorbing material, but suffers from the various defects described.

The ultraviolet-absorbing amino compound of this invention is produced by reacting (a) the hydroxyphenyl compound, (b) a compound containing at least one amino group and (c) formaldehyde, in the presence of at least one alcohol. The compound containing an amino group may be, for example, melamine guanamine and the like. In the following description, melamine is used as a typical example of the amino-containing compound. It is generally preferred to react between about 0.01 and 0.5 mole of the hydroxyphenyl compound with from about 3 to 8 moles of formaldehyde and from about 3 to 30 moles of the alcohol, per mole of melamine.

It has been found that if the amount of the hydroxyphenyl compound is present in amounts not more than 0.01 mole per mole of melamine, the ultraviolet-absorbing properties of the resulting compound are low, and are not sufficiently durable.

On the other hand, if the hydroxyphenyl compound is present in amounts greater than 0.5 mole per mole of melamine, the amount of unreacted hydroxyphenyl compound frequently increases, and the compatibility of the resulting compound with a resin or solvent tends to be reduced.

If formaldehyde is not present in amounts of at least 3 moles, the compatibility of the resulting ultraviolet-absorbing amino compound is frequently poor. If formaldehyde is present in amounts exceeding 8 moles, unreacted formaldehyde remains, thus necessitating an additional step of removing the unreacted formaldehyde.

If the amount of the alcohol is not more than 3 moles, it tends to be difficult for the resulting ultraviolet-absorbing amino compound to be compatible with resins or solvents. If the amount of the alcohol exceeds 30 moles, the ultraviolet-absorbing amino compound of this invention can be produced, but the process of manufacture is inefficient and undesirable because the yield of the ultraviolet absorbing amino compound is limited.

The alcohol used in this invention may include aliphatic or alicyclic alcohols, such as methanol, ethanol, n-propanol, isopropanol, n-butanol, isobutanol, secondary butanol, heptanol, octanol, cyclohexanol, furfuryl alcohol and tetrahydrofurfuryl alcohol. In addition, glycol ethers, such as ethylene-glycol-monomethyl-ether, ethylene-glycol monoethyl-ether, ethylene-glycol-monoisopropyl-ether, ethylene-glycol-monobutyl-ether, diethylene-glycol-monomethyl-ether, and diethylene-glycol-monobutyl-ether may also be used. Ketoalcohols, such as diacetone alcohol, and polyhydric alcohols such as ethylene-glycol, propylene-glycol, 1,4-butandiol, 1,3-butandiol and glycerol are also suitable.

The alcohol acts as a solvent for the reaction in accordance with this invention. Simultaneously, it participates in the reaction and contributes to the increase in the compatibility of the ultraviolet-absorbing amino compound with resins or solvents. The alcohol may be selected as desired depending on the resin or solvent in which the ultraviolet-absorbing amino compound is to be mixed.

The reaction for preparing the ultraviolet-absorbing amino compound is carried out as follows. The hydroxyphenyl compound and melamine usually are added to an alcohol solution of formaldehyde. The mixture is heated with stirring, preferably under acidic conditions at a pH of not more than 6. The alcohol solution of formaldehyde is prepared, for example, by mixing an aqueous solution of formaldehyde with an alcohol, or dissolving paraformaldehyde in an alcohol, or blowing gaseous formaldehyde into an alcohol to dissolve it.

The reaction temperature is usually 30° C. to 150° C., and the reaction time is usually 2 to 30 hours. At a higher reaction temperature, the reaction time is shorter, and at a lower reaction temperature, the reaction time is longer.

It is also possible to dissolve melamine in an alcohol solution of formaldehyde to react the melamine partly with formaldehyde. The hydroxyphenyl compound is added while the unreacted formaldehyde is still present, thus continuing the reaction. Alternatively, the hydroxyphenyl compound may be dissolved in an alcohol solution of formaldehyde to react partly with formaldehyde. The melamine is then added while the unreacted formaldehyde is still present in order to continue the reaction.

Formation of the improved ultraviolet-absorbing amino compound in accordance with the invention by the aforesaid reaction has been confirmed. When the reaction product is dissolved in a solvent, such as carbon tetrachloride and developed by high-speed liquid chromatography, the peak detected by a variation in refractive index coincides with the peak detected by ultraviolet absorption. This is also confirmed by the disappearance of the main peak spectrum of the hydroxyphenyl compound determined with a mass analysis device.

The ultraviolet-absorbing amino reaction product prepared in accordance with the invention can be used over a wide range of proportions. It may be added in amounts ranging from about 0.1 to 50.0 percent by weight, based on a synthetic resin, such as a synthetic resin paint or a molded article of a synthetic resin. Even when the product is used in large quantities, there is no degradation in chemical resistance, moisture resistance, or other physical properties.

Synthetic resins with which the ultraviolet-absorbing amino compound may be mixed, include synthetic resins used in paints. For example, the paint resins include (meth)acrylate copolymer resins, melamine resins, alkyd resins, polyester resins, polyurethane resins, polyamide resins and polyepoxy resins. The reaction product may also be mixed with molding resins, such as melamine resins, urea resins, phenolic resins, polyethylene resins, polypropylene resins, polystyrene resins, polyvinyl chloride resins, ABS resins and polymethacrylate resins. The ultraviolet-absorbing amino compound is mixed with synthetic resin paints during the preparation of such paints, or with molded products of resins during molding.

This ultraviolet-absorbing amino compound contains an amino, a methylol or an alkoxymethylol group and is reactive at an elevated temperature with a synthetic resin mixed therewith. Therefore, it is especially suitable for use with thermosetting synthetic resins. Thermosetting synthetic resins having superior outdoor durability can be obtained by mixing the ultraviolet-absorbing amino compound with the synthetic resin and heating the mixture. Examples of the preferred synthetic resins include the (meth)acrylate copolymer containing at least one of hydroxyl, carboxyl, glycidyl, methylolamide, alkoxymethylolamide and amino groups, an alkyd resin and a polyester resin containing a hydroxyl group and a carboxyl group, a melamine resin containing a methylol group, etc.

A paint prepared in accordance with the invention includes the ultraviolet-absorbing amino compound of the invention. The paint is a thermosetting synthetic resin paint comprising a vehicle of 50 to 98 percent by weight of a vehicle, (all percentages appearing hereinbelow are percentages by weight) of a synthetic resin. The synthetic resin contains at least one of hydroxyl, carboxyl, glycidyl, methylolamide, alkoxylmethylolamide and amino groups. The remainder of the paint comprising the ultraviolet-absorbing amino compound which is the product of reacting (a) the hydroxyphenyl compound having a light absorption maximum in the wavelength region of 300 to 400 mµ and containing a mono-, di- or tetra-hydroxyphenyl group, (b) a compound containing at least one amino group and (c) formaldehyde, in the presence of at least one alcohol.

In conventional paints containing ultraviolet absorbers, the ultraviolet absorbers are not combined with vehicles. Therefore, the absorbers usually become insoluble in the solvents of the resulting vehicles, because the solvents, such as organic solvents and water are volatilized. The absorbers precipitate, or volatilize at the time the coated film is baked or cured. However, in the paint in accordance with the invention, the vehicle component itself has the ability to absorb ultraviolet light, and the ultraviolet-absorbing amino compound in accordance with this invention is soluble widely in various organic solvents and is also dispersible in water. Accordingly, the shortcomings, such as precipitation from solvents do not occur. For this reason, a wide range of solvents can be selected, and depending upon the use or non-use or type of solvents, the paint of this invention can be obtained in various forms, such as an organic solvent-base paint, a water-base paint, and a powder paint. Moreover, since the vehicle component of the paint of this invention has the ability to absorb ultraviolet light, the inconvenience of volatilization of the ultraviolet absorber from the coated film at the time of baking the coated film do not occur.

The synthetic resin having at least one of hydroxyl, carboxyl, glycidyl, methylolamide, alkoxymethylolamide and amino groups, which is a principal element of the vehicle characterizing the paint of this invention, referred to as synthetic resin vehicle hereinafter, reacts with the ultraviolet-absorbing amino compound which is the other principal constituent of the vehicle to form a thermosetting synthetic resin film. Examples of such synthetic resin vehicle are (meth)acrylate copolymers, alkyd resins, polyester resins, and the like.

The proportion of the ultraviolet-absorbing amino compound to be mixed in the paint is from about 2 to 50%, preferably from about 5 to 30%, based on the total amount of the ultraviolet-absorbing amino compound and the synthetic resin vehicle. Therefore, the ultraviolet-absorbing amino compound can be mixed in the paint in a relatively wide range of proportions. As the proportions of these two ingredients approach the limits of these ranges, the properties of the resulting coated film tend to degrade. Conventional adjuvants, such as plasticizers, dispersants, emulsifiers, antifoamers, precipitation inhibitors, antiskinning agents and antiseptics may be added to the vehicle component of the ultraviolet-absorbing amino compound and the synthetic resin vehicle.

Solvents that can be used for the paints of this invention include alcohols, such as butyl alcohol, ethers, such as methyl ethyl ketone, esters such as ethyl acetate, aromatic hydrocarbons such as benzene, xylene and toluene, aliphatic hydrocarbons such as hexane and heptane, nitrated hydrocarbons, chlorinated hydrocarbons, and water.

The paint of this invention can be used for a clear paint without a pigment or the like. Inorganic pigments, such as titanium oxide, white lead and red iron oxide, and organic pigments such as azo pigments and metal complex salts may be included.

A coated article in accordance with the invention is characterized by having a coated film thereon, the film including ultraviolet-absorbing amino compound prepared in accordance with the invention. It is a coated article having a definite shape and on its surface a coated film containing the ultraviolet-absorbing amino compound which is the product of reaction (a) a hydroxyphenyl compound having a light absorption maximum in the wavelength region of 300 to 400 mµ and containing a mono-, di- or tetra-hydroxyphenyl group, (b) a compound containing at least one amino group and (c) formaldehyde, in the presence of at least one alcohol.

Since in the coated article of this invention, the ultraviolet-absorbing agent is chemically bonded to the vehicle component, the ultraviolet absorber does not scatter even when the coated article is exposed to high temperature. Accordingly, the ultraviolet absorption ability lasts for long periods of time, and the aesthetic characteristics of the coating can be retained for long periods of time.

The coated articles of this invention may be those having a certain definite shape, such as press-formed steel articles, and injection-molded articles of FRTP (Fiber Reinforced Thermo Plastic). The coated articles are prepared by coating the paint prepared in accordance with the invention on the surface of such an article and baking (curing) the resulting coating.

Preparation of the ultraviolet-absorbing amino compound, paint and coated article in accordance with the invention will be described in the following Examples. These Examples are intended to be illustrative and are not presented in a limiting sense.

EXAMPLE 1

A reactor equipped with a thermometer, a stirrer, a reflux condenser and a water-separating device was charged with 225 g paraformaldehyde (containing 80 percent by weight formaldehyde) and 370 g n-butanol, and they were stirred at 90° C. for 30 minutes to prepare an n-butanol solution of formaldehyde. Then, 126 g melamine and 11.4 g 2-hydroxy-4-methoxybenzophenone (absorption maximum being 310 m$\mu$) were added, and the mixture was heated to 110° C., followed by stirring for 30 minutes. After confirming that the reaction mixture became clear, the pH of the reaction mixture was adjusted to 5.0 with a 20% aqueous solution of formic acid. The reaction was continued for 5 hours while removing water out of the reaction system at the refluxing temperature of n-butanol. The reaction mixture was then cooled, and its pH was adjusted to 7.0 with a 10% aqueous solution of sodium hydroxide to prepare an n-butanol solution of a novel ultraviolet absorber. The resulting n-butanol solution of said novel ultraviolet absorber and a heating residue of 60% (measured by the method of JIS K-5400 i.e. Japan Industrial Standards K-5400) and a viscosity of 2.3 poises (20° C.).

The above reaction product was diluted to 100 times with chloroform, and developed by a high-speed liquid chromatographic instrument (FLC-A 700, a product of Nippon Bunko Corp.), and the peaks were detected by variation in refractive index and by ultraviolet absorption. The formation of the novel ultraviolet-absorbing amino compound was confirmed by the agreement of the peaks of charts determined by the two detecting methods.

Thirty-parts by weight of the ultraviolet-absorbing amino compound solution were mixed with 100 parts by weight of a synthetic resin vehicle to form a clear paint. The resin vehicle was a 50% xylene solution of a methacrylate copolymer composed of 80% by weight n-butyl methacrylate, 18% by weight 2-hydroxypropyl methacrylate and 2% by weight acrylic acid. The paint was coated on an aluminum plate to a dry coating thickness of 20 microns, and heated at 150° C. for 20 minutes in an electric oven to form a coated plate. The coated plate was evaluated as follows:

(a) Appearance of the coated film: smooth and clear
(b) Gloss (60° reflectance): 98
(c) Chemical resistance (dipped at 30° C. for 100 hours in a 5% aqueous solution of sodium hydroxide): no change
(d) Moisture resistance (allowed to stand for 1,000 hours in a wet vessel at 50° C. and at a relative humidity of 98%): no change
(e) Outdoor durability (exposed outdoors for 3 years):
  (i) Gloss retention: 88%
  (ii) Changes such as cracks or peeling were not observed.

EXAMPLE 2

A reactor equipped with a thermometer, a stirrer, a reflux condenser and a water-separating device was charged with 300 g of paraformaldehyde (containing 80% by weight of formaldehyde), 370 g iso-butanol and 600 g isopropyl alcohol. The mixture was stirred at 90° C. for 30 minutes to prepare a solution of formaldehyde in iso-butanol and isopropyl. Then, 126 g melamine and 11.4 g 2,4-dihydroxybenzophenone (absorption maximum of 310 m$\mu$) were added, and the mixture was heated to 95° C., followed by stirring for 30 minutes. After confirming that the reaction mixture became clear, the pH of the reaction mixture was adjusted to 5.0 with a 20% aqueous solution of formic acid.

The reaction was continued for 4 hours at the refluxing temperature of the iso-propanol, and then, the pH of the reaction mixture was adjusted to 7.0 with a 10% aqueous solution of sodium hydroxide. The excess of the alcohols and the by-product water were completely distilled from the system under reduced pressure. After cooling, 100 g isobutanol and 70 g xylene were added, followed by filtration to yield a solution of the novel ultraviolet absorber in isobutanol and xylene. The resulting solution had a heating residue of 60 percent (measured by JIS K-5400 method) and a viscosity of 1.5 poises (20° C.).

The reaction product of Example 2 was diluted to 100 times with chloroform, and developed by a high-speed liquid chromatographic instrument (FLC-A 700, a product of Nippon Bunko Corp.) The peaks were detected by variation in refractive index and by ultraviolet absorption, and the formation of the novel ultraviolet-absorbing amino compound was confirmed by the agreement of the peaks of charts determined by the two detecting methods.

Thirty parts by weight of the aforesaid ultraviolet-absorbing amino compound solution were mixed with 100 parts by weight of a 50% xylene solution of a methacrylate copolymer vehicle to form a clear paint. The copolymer was composed of 80% by weight of n-butyl methacrylate, 18% by weight of 2-hydroxylpropyl methacrylate and 2% by weight of acrylic acid. The clear paint was coated on an aluminum plate to a dry film thickness of 20 microns, and heated at 150° C. for 20 minutes in an electric oven to form a coated plate. The coated plate was evaluated as follows:

(a) Appearance of the coated film: smooth and clear
(b) Gloss (60° reflectance): 96
(c) Chemical resistance (dipped at 30° C. for 100 hours in a 5% aqueous solution of sodium hydroxide) no change
(d) Moisture resistance (allowed to stand for 1000 hours in a wet vessel at 50° C. and at a relative humidity of 98%): no change
(e) Outdoor durability (outdoor exposure for 3 years):
  (i) Gloss retention: 86%
  (ii) Changes such as cracks or peeling were not observed.

EXAMPLE 3

A first comparative test of the paint of Example 1 was performed as follows. A product having a heating residue of 60% (measured by JIS K-5400 method) and a viscosity of 2.3 poises (20° C.) was produced in the same manner as in Example 1, except that the 2-hydroxy-4-methoxybenzophenone was not added. (The product will be referred to as Reaction Product A). Thirty parts by weight of Reaction Product A were mixed with 100 parts by weight of a 50% xylene solution of the same methacrylate copolymer vehicle as used in Example 1 to form a clear paint. The paint was coated in the same manner as in Example 1 to form a coated plate. The following results of evaluation were obtained.

(a) Appearance of the coated film: smooth and clear
(b) Gloss (60° reflectance): 98
(c) Chemical resistance (dipped for 100 hours at 30° C. in a 5% aqueous solution of sodium hydroxide): blister occurred locally
(d) Moisture resistance (allowed to stand for 1000 hours in a wet vessel at 50° C. and at a relative humidity of 98%): blister occurred locally
(e) Outdoor durability (exposed outdoors):
No change after two-year exposure. At three-year exposure, cracks occurred on the entire surface, and the coated film peeled off partially.

EXAMPLE 4

A second comparative test of the paint of Example 1 was performed as follows. One hundred parts by weight of the same 50% xylene solution of methacrylate copolymer as used in Example 1 were added to 30 parts by weight of the Reaction Product A of Example 3. Further, 0.5 part by weight of 2-hydroxy-4-methoxybenzophenone was added thereto to form a clear paint. A coated plate was prepared in the same manner as in Example 1. The following results of the evaluation were obtained.

(a) Appearance of the coated film: smooth and clear
(b) Gloss (60° refectance): 98
(c) Chemical resistance (dipped for 100 hours at 30° C. in a 5% aqueous solution of sodium hydroxide): blister occurred locally
(d) Moisture resistance (allowed to stand for 1000 hours in a wet vessel at 50° C. and at a relative humidity of 98%): blister occured locally
(e) Outdoor durability (exposed outdoors): No change after two-year exposure. At three-year exposure, cracks occurred on the entire surface, and partial peeling occurred.

EXAMPLE 5

A reactor equipped with a thermometer, a stirrer, a reflux condenser and devices for recovering solvents and by-products was charged with 375 g paraformaldehyde (containing 80% by weight formaldehyde) and 480 g methanol. The mixture was stirred at 60° C. for 30 minutes to form a methanol solution of formaldehyde. Then, 126 g melamine and 21.4 g 2,4-dihydroxybenzophenone (absorption maximum of 310 mμ) were added. The mixture was heated to 80° C.-90° C., and stirred for 30 minutes. At this time the pH of the reaction mixture was adjusted to 4.0 with a 20% aqueous solution of hydrochloric acid. Then, the mixture was stirred for 60 minutes while maintaining a temperature of 60° C. The pH of the mixture was adjusted to between 8 and 9 with a 10% aqueous solution of sodium hydroxide. The excess methanol and the by-product water were distilled out of the system by heating under reduced pressure. After the water and methanol were distilled off completely, the residue was filtered to yield a novel ultraviolet-absorbing amino resin. The resulting resin had a heating residue of 98% (measured by the JIS K-5400 method) and a viscosity of 85 poises at 20° C.

The resin reaction product was diluted to 100 times with chloroform, and developed by a high-speed liquid chromatographic instrument (FLC-A 700, a product of Nippon Bunko Corp.). The peaks were detected by variation in refractive index and by ultraviolet absorption, and the formation of the novel ultraviolet-absorbing amino resin was confirmed by the agreement of the peaks of the charts determined by the two detecting methods.

A mixture consisting of 202 parts by weight trimethylolpropane, 313 parts by weight neopentyl glycol, 233 parts by weight adipic acid and 396 parts by weight isophthalic acid was heated and condensed, and 130 parts by weight of water were removed. To 100 g of a 60% ethylene glycol monobutyl ether solution of the resulting polyester resin were added 3.8 g dimethylethanolamine as a neutralizing agent. Then 20 g of water were added to form a 50% solution of the neutralized water-soluble polyester resin in ethylene glycol monobutyl ether and water. Twenty parts by weight of the above novel ultraviolet absorbing amino resin were mixed with 100 parts by weight of the 50% solution of the water-soluble polyester resin in ethylene glycol monobutyl ether and water to form a clear paint. The paint was coated on an aluminum plate to a dry film thickness of 20 microns, and heated at 180° C. for 20 minutes in an electric oven to form a coated plate. The following results of evaluation were obtained.

(a) Appearance of the coated film: smooth and clear
(b) Gloss (60° reflectance): 97
(c) Chemical resistance (dipped for 100 hours at 30° C. in a 5% aqueous solution of sodium hydroxide): no change
(d) Moisture resistance (allowed to stand for 1000 hours in a wet vessel at 50° C. and at a relative humidity of 98%): no change
(e) Outdoor durability (exposed outdoors for three years)
 (i) Gloss retention: 90%
 (ii) Changes such as cracks or peeling were not observed.

EXAMPLE 6

A reaction product having a heating residue of 98% (measured by the method of JIS K-5400) and a viscosity of 82 poises (20° C.) was produced in the same way as in Example 5 except that the 2,4-dihydroxybenzoiphenone was omitted. Twenty parts by weight of the reaction product were mixed with 100 parts by weight of the same 50% solution of the neutralized water-soluble polyester in ethylene glycol monobutyl ether and water, and 1.2 parts by weight of 2,4-dihydroxybenzophenone were added to form a clear paint. A coated plate was formed in the same manner as in Example 5, and the following results of evaluation were obtained:

(a) Appearance of the coated film: Insoluble matter was dotted on the surface of the coated film, and the surface was not smooth.
(b) Gloss (60° reflectance): 45
(c) Chemical resistance (dipped for 100 hours at 30° C. in a 5% aqueous solution of sodium hydroxide): blistering occurred on the entire surface
(d) Moisture resistance (allowed to stand for 1000 hours in a wet vessel at 50° C. and at a relative humidity of 98%): blistering occurred on the entire surface.
(e) Outdoor durability (exposed outdoors): cracks occurred after two-year exposure; after three years cracks occurred on the entire surface and part of the coated film peeled off.

EXAMPLE 7

A reactor equipped with a thermometer, a stirrer, a reflux condenser and devices for recovering solvents and byproducts was charged with 375 g paraformaldehyde (containing 80% by weight of formaldehyde) and 1000 g cyclohexanol. The mixture was stirred at 80° C. until the paraformaldehyde completely dissolved to form a cyclohexanol solution of formaldehyde. The pH of the solution was adjusted to 11.0 with a 10% aqueous solution of sodium hydroxide. Then, 126 g melamine, 310 g ethylene glycol, 45.0 g 2-(2-hydroxy-5-methylphenyl)-2H-benzotriazole (absorption maximum being 345 m$\mu$), and 19.7 g phenyl salicylate (absorption maximum being 310 m$\mu$) were added. The mixture was stirred at 80° C. for 30 minutes and cooled to 40° C. The pH of the mixture was adjusted to 2.0 with a 30% aqueous solution of hydrochloric acid, and the mixture was stirred at 40° C. for 60 minutes. Then, the pH of the mixture was again adjusted to 9.0 with a 10% aqueous solution of sodium hydroxide. The unreacted cyclohexanol and the by-product water were distilled out of the system, and a small amount of methanol was added, followed by filtration. The resulting filtrate was dried to evaporate the methanol completely. The dried product was pulverized to obtain a novel ultraviolet-absorbing amino resin which was a powdery material.

The resin reaction product was diluted to 100 times with chloroform, and developed by a high-speed liquid chromatographic instrument (FLC-A 700, a product of Nippon Bunko Corp.). The peaks were detected by variation in refractive index and by ultraviolet absorption, and the formation of the novel ultraviolet-absorbing amino resin was confirmed by the agreement of the peaks of the charts determined by the two detecting methods.

Eighty-five parts by weight of solid styrene-(meth)acrylate copolymer having a number average molecular weight of 5,000 and prepared by copolymerizing 30% by weight styrene, 40% by weight methyl methacrylate, 10% by weight ethyl acrylate and 20% by weight glycidyl methacrylate were mixed fully with 15 parts by weight of eicosanedicarboxylic acid, 5 parts by weight of the ultraviolet-absorbing amino resin prepared as above, and 1.0 part by weight of a coated surface-conditioning aid of the polyacrylate type. The mixture was melted and kneaded at 100° C. for 10 minutes by a heated roll, cooled, and then finely pulverized to form a clear powder paint. The clear powder paint was coated on an aluminum plate to a film thickness of 60 microns by an electrostatic powder coating machine, and baked at 180° C. for 20 minutes in an electric oven to form a coated plate. The following results of evaluation were obtained about this coated plate.

(a) Appearance of the coated film: smooth and clear (b) Gloss (60° reflectance): 99

(c) Chemical resistance (dipped for 100 hours at 30° C. in a 5% aqueous solution of sodium hydroxide): no change (d) Moisture resistance (allowed to stand for 1000 hours in a wet vessel at 50° C. and at a relative humidity of 98%): no change (e) Outdoor durability (exposed outdoors for three years):

(i) Gloss retention: 89%

(ii) Changes such as cracks or peeling were not observed.

EXAMPLE 8

The procedures of Example 1 were followed to produce the ultraviolet-absorbing amino compound. An n-butanol solution of the ultraviolet-absorbing amino compound having 1%, as solids, of 2-hydroxy-4-methoxybenzophenone chemically bound thereto (the solids concentration of the solution was 60%) was prepared. Thirty parts, calculated as solids content, of the resulting n-butanol solution of the ultraviolet-absorbing amino compound were mixed with 70 parts, calculated as solids content, of a xylene solution of a methacrylate copolymer composed of 80% n-butyl methacrylate, 18% 2-hydroxypropyl methacrylate and 2% acrylic acid (the solids content of the solution was 50%) to prepare a clear paint containing the ultraviolet-absorbing amino compound of this invention (the total solids content being 100 parts).

In order to examine the extent of volatilization of the ultraviolet-absorbing amino compound at the time of baking the clear paint and the effect of temperature after the curing of the coated film, the above clear paint was brush-coated on one surface of three of the same quartz cells. After the coating, the cells were allowed to stand at room temperature for 3 hours, and then placed in a desiccator for 10 hours under reduced pressure in order to volatilize any solvents. In each case, the thickness of the dry coated film was 15 microns. One of the samples was selected as a sample not to be baked or subjected to high temperature (the non-baked sample). The remaining two samples were then baked at 140° C.±5° C. for 30 minutes in an electric hot air-circulating type oven. One of the baked samples was reserved as a baked sample. The other sample was placed in an electric hot air-circulating type oven for 20 hours at 100° C.±2° C. to treat it at high temperature. This treated sample was denoted as a baked and subjected to high temperature sample (or treated sample).

The light transmittance at 330 m$\mu$ wavelength of each of the three samples was measured by a spectrophotometer, and the relative amount of the ultraviolet-absorbing ability of the coated films was examined. If the ultraviolet-absorbing ability of the non-baked coated film was assigned a value of 100, the value of the ultraviolet-absorbing ability of the baked sample and the treated sample were 99.

For comparison, samples were prepared in the same manner using a clear paint prepared by mixing and stirring an amino resin which did not contain an ultraviolet absorber. The paint was prepared in accordance with Example 1, using a methacrylate copolymer resin and 2-hydroxy-4-methoxybenzophenone. The value of the ultraviolet-absorbing ability was determined. If the value of the ultraviolet-absorbing ability of the non-baked coated film was assigned a value 100, the value of the ultraviolet-absorbing ability of the baked coated film was 90, and the value of the ultraviolet-absorbing ability of the baked and high temperature-treated coated film was 84.

It is seen from the results of Example 8 and the comparative tests therein that in paint prepared in accordance with the invention, there is minimal volatilization of the ultraviolet absorber. This is true even when the paint is exposed to high temperature for long periods of time, both at the time of baking and after baking. The ultraviolet absorber remains in the coated film.

EXAMPLE 9

Following the same method of producing an ultraviolet-absorbing amino compound as described in Example 2, an alcohol solution of an ultraviolet-absorbing amino compound having 1%, as solids, of 2-(2'-hydroxy-3',5'-dineopentylphenyl) benzotriazole chemically bonded thereto (the solids concentration of the solution was 60%) was prepared. Thirty parts, calculated as solids content, of this alcohol solution of the ultraviolet-absorbing amino compound were mixed with 70 parts calculated as solids content, of a xylene solution of a methacrylate copolymer composed of 80% n-butyl methacrylate, 18% 2-hydroxypropyl methacrylate and 2% acrylic acid (the solids concentration of the solution was 50%) to prepare a clear paint containing the ultraviolet-absorbing amino compound of this invention (the total solids content being 100 parts).

In order to examine the amount of the ultraviolet-absorbing ability of this paint, the paint was baked in the same way as in Example 8, and the effect of the baking and high-temperature treatment was examined. As a result, it was found that if the ultraviolet-absorbing ability of the coated film not subjected to baking and high temperature treatment was taken as 100, the ultraviolet-absorbing ability of the coated film baked at 140° C.±5° C. for 30 minutes was 97, and the ultraviolet absorbing ability of the coated film which was baked at 140° C.±5° C. for 30 minutes and then exposed to high temperature of 100° C.±2° C. for 20 hours was 95.

For comparison, samples were prepared in the same manner as described in Example 8. A clear paint was prepared by mixing an amino resin of a methacrylate copolymer and 2-(2'-hydroxy-3',5'-dineopentylphenyl)-benzotriazole by the method of Example 2, but not containing an ultraviolet absorber. The value of the ultraviolet-absorbing ability of the samples was determined. As a result, if the ultraviolet-absorbing ability of the non-baked coated film was assigned a value of 100, the ultraviolet-absorbing ability of the baked coated film was 48, and the ultraviolet-absorbing ability of the coated film baked and subjected to high temperature was 32.

EXAMPLE 10

This Example illustrates preparation of a coated article in accordance with this invention as applied to an automobile.

An automobile body was chemically treated in the usual manner for example, zinc-phosphate was coated on the surface of the automobile body. A polybutadiene paint was electrodeposited on the surface and baked at 160° C. for 40 minutes to form a primer coating having a thickness of 20 microns. Then, an aminoalkyd paint was electrostatically coated on the top of the primer coating and baked at 140° C. for 30 minutes to form a coated film having a thickness of 35 microns as an intermediate layer. An acrylic enamel base paint was electrostatically coated on the top of this intermediate layer. On top of the base paint, a clear paint containing the ultraviolet-absorbing amino resin described in Example 9 was electrostatically coated wet-on-wet, and baked at 140° C. for 30 minutes to produce a coated article in accordance with this invention. The enamel base and the clear paint film each had a thickness of 15 microns.

In order to determine the durability of this coated article, a primer layer, an intermediate layer and an acrylic enamel base were formed on an automobile hood by the method of coating described above. Then, the clear paint containing the ultraviolet-absorbing amino compound was coated on the right half of the hood. The clear paint described in Example 9 which was prepared by mixing 2-(2'-hydroxy-3',5'-dineopentylphenyl)benzotriazole with an amino resin and a methacrylate copolymer was coated on the left half of the hood. The coated film was baked at 140° C. for 30 minutes. This hood was mounted on an automobile, and the automobile was actually driven for 30 months in Okinawa Prefecture.

The clear-coated layers of the left half and right half of this hood were shaved off by a knife, and subjected to mass spectroscopy. The amount of the ultraviolet absorber, 2-(2'-hydroxy-3',5'-dineopentylphenyl)benzotriazole, was measured from a peak corresponding to its molecular ion. It was found that on the right half of the hood, the value of the amount of the remaining ultraviolet absorber was 85 when the value of the amount of the ultraviolet absorber immediately after coating was assigned a value of 100. However, on the left half of the hood, the value of the amount of reamining ultra-violet absorber was only 4.

It will thus be seen that the objects set forth above, among those made apparent from the preceding description, are efficiently attained and, since certain changes may be made in carrying out the above method and in the composition set forth without depending from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An ultraviolet-absorbing amino compound which is formed by mixing (a) a hydroxyphenyl compound having an absorption maximum within a wavelength region of 300 to 400 m$\mu$ and containing a mono-, di- or tetra-hydroxyphenyl group, (b) an amino compound containing at least one amino group, and (c) formaldehyde, in the presence of at least one alcohol; and heating the mixture with stirring to react the three components to form the ultraviolet-absorbing amino compound reaction product.

2. The product of claim 1, wherein the hydroxyphenyl compound is a compound selected from the group consisting of a hydroxybenzophenone compound, a hydroxyphenyl benzotriazole compound and a phenyl salicylate compound and mixtures thereof.

3. The product of claim 2, wherein said hydroxybenzophenone compound is 2-hydroxy-4-methoxybenzophenone.

4. The product of claim 2, wherein said hydroxybenzophenone compound is 2,4-dihydroxybenzophenone.

5. The product of claim 2, wherein said hydroxyphenyl benzotriazole compound is 2-(2-hydroxy-5-methyl-phenyl)-2H-benzotriazole.

6. The product of claim 2, wherein said hydroxyphenyl benzotriazole compound is 2-(2'-hydroxy-3',5'-dineopentylphenyl) benzotriazole.

7. The product of claim 2, wherein said phenyl salicylate compound is phenyl salicylate.

8. The product of claim 1, wherein said amino compound is a compound selected from the group consisting of melamine, guanamine and mixtures thereof.

9. The product of claim 1, wherein said alcohol is selected from the group consisting of aliphatic alcohols, alicyclic alcohols, glycol ethers, ketoalcohols, polyhydric alcohols and mixtures thereof.

10. The product of claim 9, wherein said aliphatic alcohol is selected from the group consisting of methanol, isopropanol, n-butanol, isobutanol and mixtures thereof.

11. The product of claim 9, wherein said alicyclic alcohol is cyclohexanol.

12. The product of claim 9, wherein said glycol ether is ethylene-glycol-monobutyl-ether.

13. The product of claim 9, wherein said ketoalcohol is diacetone alcohol.

14. The product of claim 9, wherein said polyhydric alcohol is ethylene-glycol.

15. The product of claim 1, wherein from about 0.01 to 0.5 mole of the hydroxyphenyl compound, from about 3 to 8 moles of formaldehyde and from about 3 to 30 moles of the alcohol are mixed per mole of the amino compound.

16. The ultraviolet-absorbing amino compound of claim 1 having an absorption maximum within a wavelength region of 300 to 400 m$\mu$ and having at least one of an amino group, a methylol group and an alkoxymethylol group.

17. A method of preparing an ultraviolet-absorbing amino compound which comprises:
mixing (a) a hydroxyphenyl compound which has an absorption maximum within a wavelength region of 300 to 400 m$\mu$ and contains one of a mono-, di- or tetra-hydroxyphenyl group, (b) an amino compound which contains at least one amino group, and (c) formaldehyde, in the presence of at least one alcohol; and
heating the mixture while stirring to react said three components with each other.

18. The method of claim 17, wherein said hydroxyphenyl compound is a compound selected from the group consisting of a hydroxybenzophenone compound, a hydroxyphenyl benzotriazole compound and a phenyl salicylate compound and mixtures thereof.

19. The method of claim 17, wherein said amino compound is a compound selected from the group consisting of melamine, guanamine and mixtures thereof.

20. The method of claim 17, wherein said alcohol is one selected from the group consisting of aliphatic alcohols, alicyclic alcohols, glycol ethers, ketoalcohols, polyhydric alcohols and mixtures thereof.

21. The method of claim 17, wherein from about 0.01 to 0.5 mole of the hydroxyphenyl compound, from about 3 to 8 moles of formaldehyde and from about 3 to 30 moles of the alcohol are mixed per mole of the amino compound.

22. The method of claim 17, including in the mixing step, adding the hydroxyphenyl compound and said amino compound to an alcohol solution of formaldehyde.

23. The method of claim 17, including in the mixing step, dissolving said amino compound in an alcohol solution of formaldehyde and then adding said hydroxyphenyl compound to said alcohol solution of formaldehyde and mixing with each other.

24. The method of claim 17, including in the mixing step, dissolving the hydroxyphenyl compound in an alcohol solution of formaldehyde and then adding said amino compound to said alcohol solution of formaldehyde and mixing with each other.

25. The method of claims 22, 23 or 24, wherein in the mixing step, said alcohol solution of formaldehyde is prepared by mixing an aqueous solution of formaldehyde with an alcohol.

26. A method according to claims 22, 23 or 24, wherein in the mixing step, said alcohol solution of formaldehyde is prepared by dissolving paraformaldehyde in an alcohol.

27. A method according to claims 22, 23 or 24, wherein in the mixing step, said alcohol solution of formaldehyde is prepared by blowing gaseous formaldehyde into an alcohol to dissolve the formaldehyde.

28. The method of claim 17, wherein in the mixing step, the mixture is heated with stirring under acidic conditions at a pH of 6 or less.

29. The method of claim 28, including heating the mixture for from about 2 to 30 hours at a temperature within a range of from about 30° C. to 150° C.

* * * * *